United States Patent Office 3,108,029
Patented Oct. 22, 1963

3,108,029
RESINOUS COMPOSITION AND PROCESS OF PREPARATION
Henry P. Wohnsiedler, Darien, Conn., and Clayton J. Ammondson, New Brunswick, N.J., assignors to American Cyanamid Company, New York, N.Y., a corporation of Maine
No Drawing. Filed July 1, 1953, Ser. No. 365,553
16 Claims. (Cl. 156—330)

This invention relates to oxirane triazines. More particularly this invention relates to the preparation of polymerizable oxirane triazines and the polymerization and polymerized products thereof.

The preparation of a polymerizable compound containing both the triazine ring and a reactive epoxy group has long been sought for a number of reasons. One aim has been to utilize the good heat and light resistance and general stability of the triazine ring in polymeric products. Another objective has been the formation of polymeric triazines by an addition rather than condensation mechanism since this affords a means of avoiding the formation of volatile by-products. The amino triazines in the form of their formaldehyde reaction products are an outstanding example of triazines which undergo polymerization by condensation. These products enjoy a wide utility. In some applications, such as molding, however, the water of condensation remains in the cured or polymerized product and this may lead to some degree of dimensional instability. The avoidance of this condition is one of the present objectives. It is also the purpose to prepare polymerizable triazine derivatives which can be used in the preparation of surface coatings having superior properties. Thus, the products which are to be described may be cured in film or molded form simply by application of heat to a solvent resistant state, the cured products possessing excellent color and heat resistance. The polymerization of the product is through ether linkages of the epoxide groups which provide the cured resins with good chemical resistance, color, adhesion and flexibility.

Previous attempts to produce a polymerizable oxirane triazine have not been successful. When epichlorohydrin is reacted with cyanuric acid, a water soluble, non-curing product is obtained that does not contain an oxirane ring. Ericks, U.S. Patent No. 2,381,121, prepared surface active agents by reaction of various amino triazines with a compound containing an ethylene oxide ring, particularly glycidol. The products formed were not shown to be polymerizable. Thus, so far as is known, no preparation of a polymerizable oxirane triazine has been described previously.

We have found that a polymerizable reaction product containing an oxirane and a triazine ring may be obtained by reacting in the presence of a halogen acceptor a monohalohydrin of a saturated aliphatic trihydric alcohol wherein the halogen is selected from the group consisting of chlorine, bromine, and iodine with a compound represented by the general formula

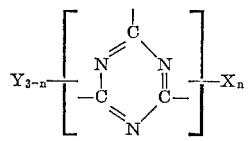

wherein X represents a halogen, Y represents (a) a member selected from the class consisting of hydrogen and alkyl, alkenyl, aryl, alkaryl and aralkyl radicals, (b) amine radicals represented by the formula —NRR' where R and R' each represents a member having the same meaning as (a), and (c) radicals represented by the formula —OR" where R" represents a member selected from the group consisting of alkyl, alkenyl, aryl, alkaryl and aralkyl radicals, and $n$ represents an integer which is at least 1 and not more than 3. From a consideration of the above formula, it will be noted that when $n$ is 3 there will be no radicals represented by Y added to the triazine nucleus.

Illustrative examples of hydrocarbon radicals which R, R' and R" may represent in the above formula are: saturated aliphatic, e.g., methyl ethyl, propyl, isopropyl, butyl, isobutyl, sec-butyl, amyl, isohexyl, octyl, decyl, dodecyl, octadecyl, etc., including saturated cycloaliphatic, e.g., cyclopentyl, cyclohexyl, cycloheptyl, and aromatic substituted saturated aliphatic, e.g., benzyl, phenylethyl, phenylpropyl, phenylisopropyl, etc.; aromatic phenyl, biphenyl, naphthyl, etc., including saturated aliphatic substituted aromatic, e.g., tolyl, xylyl, ethylphenyl, propylphenyl, isopropylphenyl, butylphenyl, etc. Illustrative examples of alkenyl radicals which may be employed in the above formula are allyl, methallyl, ethallyl, propallyl, 2-butenyl, 3-butenyl, 3-methyl-2-butenyl, 3-methyl-3-butenyl, 2-pentenyl, 3-pentenyl, 4-pentenyl, 2-methyl-2-pentenyl, 3-methyl-4-pentenyl, 2-hexenyl, 3-nonenyl, etc.

Examples of compounds embraced by the formula set forth above are:

cyanuric chloride;
2,4-dichloro-1,3,5-triazine;
2,4-dibromo-6-phenyl-1,3,5-triazine;
2,4-dichloro-6-methyl-1,3,5-triazine;
4,6-diiodo-2-alloxy-1,3,5-triazine;
2,4-dichloro-6-methoxy-1,3,5-triazine;
2-amino-4,6-dichloro-1,3,5-triazine;
2-butylamino-4,6-dibromo-1,3,5-triazine;
2-diallylamino-4,6-dichloro-1,3,5-triazine;
2,4-diamino-6-chloro-1,3,5-triazine;
2-amino-4-bromo-6-methylamino-1,3,5-triazine;
2-amino-4-iodo-6-o-toluino-1,3,5-triazine;
2-chloro-4-di(n-butyl)amino-6-ethylamino-1,3,5-triazine;
2,4-bis(diallylamino)-6-fluoro-1,3,5-triazine;
2-chloro-4-hexylamino-6-phenylethylamino-1,3,5-triazine;
2-amino-4-bromo-6-propyl-1,3,5-triazine;
2-amino-4-chloro-6-propyl-1,3,5-triazine;
2-chloro-4-ethylamino-6-phenyl-1,3,5-triazine;
2-butyl-4-chloro-6-propylamino-1,3,5-triazine;
2-bromo-4,6-bis(diallylamino)-1,3,5-triazine;
2-fluoro-4-methylamino-1,3,5-triazine;
2-amino-4-chloro-1,3,5-triazine;
2-amino-4-chloro-6-phenoxy-1,3,5-triazine;
2-chloro-4-methylamino-6-methoxy-1,3,5-triazine;
2-di(n-butyl)amino-4-iodo-methoxy-1,3,5-triazine;
2-bromo-4-diethylamino-6-phenoxy-1,3,5-triazine;
2-bromo-4-ethoxy-6-octylamino-1,3,5-triazine;
2-cyclohexylamino-4-ethoxy-6-iodo-1,3,5-triazine;
2,4-ethoxy-6-fluoro-1,3,5-triazine;
2-chloro-4,6-dibutoxy-1,3,5-triazine;
2-chloro-4,6-diphenoxy-1,3,5-triazine;
2-bromo-4-phenoxy-1,3,5-triazine;
2,4-diiodo-6-phenoxy-1,3,5-triazine;
2-fluoro-1,3,5-triazine;
2-chloro-4-decyl-6-p-tertiary-butylphenoxy-1,3,5-triazine;
2-bromo-4-phenyl-6-p-tertiary-butylphenoxy-1,3,5-triazine;
2-chloro-4,6-dipropyl-1,3,5-triazine;
2-chloro-4-methyl-1,3,5-triazine, etc.

The monohalohydrins of a saturated aliphatic trihydric alcohol that are employed in the process of our invention are derivatives of trihydric alcohols such as glycerol, butanetriol-1,2,4; pentanetriol-1,2,5; hexanetriol-1,2,6 and similar analogs. It is preferred that the trihydric alcohol contain not more than 10 carbon atoms. The halohydrins are distinguished by having at least one primary hydroxyl group and preferably one primary and one secondary hydroxyl. The halogen atom is preferably substituted on a carbon adjacent to the carbon bearing the secondary hydroxyl. The halogens may include chlorine, bromine and iodine. Alpha monochlorohydrin of glycerol (1-chloropropanediol) is the preferred alcohol halide and simple analogs may be represented by

where U represents alkylene radicals and Z represents hydrogen and aliphatic radicals. Thus, the halohydrins may include 1-chlorobutanediol-2,4; 3-chloro-pentanediol-1,4, etc. Glycerol-beta-monochlorohydrin represents a compound where a diprimary hydroxyl bearing monohalohydrin may be utilized in our invention. Other halohydrins that find use in our invention are such as 3-chlorobutanediol-1,2; 2-bromobutanediol-1,3; 1-chloropentanediol-2,5; 3-iodopentanediol-2,5; 1-chlorohexanediol-2,6; 2-bromohexanediol-3,6; 3-chlorohexanediol-1,2 and the like.

In the reaction between the halo triazine and the monohalohydrin, reaction probably first takes place at the primary hydroxyl position of the latter. In the second stage, the secondary hydroxyl participates in dehydrohalogenation leading to formation of the oxirane ring.

In order that those skilled in the art may more fully understand the inventive concept herein presented, the following examples are given by way of illustration. All parts set forth are parts by weight and should not be considered limitations unless otherwise noted in the appended claims.

*Example 1*

184 parts of cyanuric chloride and 331.5 parts of glycerol-alpha-monochlorohydrin were dissolved in 1200 parts of dioxane. 240 parts of dry finely powdered sodium hydroxide were added to the vigorously stirred dioxane solution over a period of 2 hours. Some external cooling was necessary to maintain the temperature between 25–35° C. The mixture was stirred for an additional 5 hours at about 30–35° C. and then filtered. The solid was pressed dry, slurried with 300 parts fresh dioxane at 40° C. and refiltered. The combined filtrates were concentrated under reduced pressure, keeping the pot temperature below 35° C., to give 550 parts of solution which was 36.5% solids. The analysis of the reaction product was as follows:

| | Found | Calc. for triglycidyl cyanurate |
|---|---|---|
| Percent N | 12.5 | 14.7 |
| Percent oxirane-oxygen | 10.4 | 16.2 |
| Percent Cl | 7.8 | None |
| Percent ash (at 850° C.) | 0.55 | None |

(All figures are based on solids.)

*Example 2*

The procedure of Example 1 was followed except that the temperature of reaction was held below 20° C. with external cooling during an hour's addition of sodium hydroxide and an additional ¾ hour of stirring. The reaction mixture was then heated to 95° C. for 2 hours. After filtration, all of the dioxane was removed from the filtrate by low temperature vacuum distillation to leave a thin oily reaction product. A total yield of 17% of the oxirane oxygen expected was obtained.

*Example 3*

A similar procedure as set forth in Example 2 was followed except the temperature was held below 20° C. during the 1¾ hour of addition of sodium hydroxide and during an additional 4 hours of stirring. The oily reaction product remaining from vacuum concentration of the dioxane solution gave a yield of 31.6% of the oxirane oxygen expected.

*Example 4*

5.5 parts of glycerol-alpha-monochlorohydrin and 8.8 parts of 2-chloro-4,6-dimethoxy-1,3,5-triazine were dissolved in 70 parts of dioxane. 4 parts of powdered sodium hydroxide were added and the temperature maintained at 35–38° C. The reaction mixture was stirred 5 hours at 27–30° C. and filtered. The dioxane solution was then vacuum concentrated below 35° C. to give a thin oily reaction product which contained 53.3% of the oxirane oxygen expected.

*Example 5*

2-chloro-4,6-diphenoxy-s-triazine was prepared according to the method described in J.A.C.S. 73, page 2992 (1951). Thirty parts together with 11 parts glycerol-alpha-monochlorohydrin were dissolved in 75 parts dioxolane and as the mixture was stirred 8 parts powdered sodium hydroxide were added over a period of about 20 minutes while controlling the temperature at 25–30° C. Following an additional hour at this temperature the mixture was filtered. The solution obtained yielded a water white, resinous film when dried at 70° C.

*Example 6*

1.3 parts of 2-amino-4-chloro-6-dibutylamino-s-triazine and 0.55 part of glycerol-alpha-monochlorohydrin were dissolved in 10 parts acetone and 0.40 part sodium hydroxide reacted therewith at 20–25° C. The solution obtained yielded a partly crystalline product on drying. Infrared absorption technique disclosed the presence of epoxide in the product.

*Example 7*

1.1 parts of 2-amino-4-chloro-6-phenylamino-s-triazine and 0.55 part of glycerol-alpha-monochlorohydrin were reacted as above with 0.4 part sodium hydroxide using 10 parts dioxane as solvent. The recovered product was partly crystalline.

*Example 8*

0.75 part of 2-chloro-4,6-di(phenylamino)-1,3,5-triazine and 0.28 part of glycerol-alpha-monochlorohydrin were reacted in 7.5 parts diethyl ether of ethylene glycol with 0.20 part sodium hydroxide. The product recovered from solution was partly crystalline. When heated it first melted and then set due to thermoreactivity.

*Example 9*

2,4-dichlor-6-p-tertiarybutylphenoxy-s-triazine was prepared according to the method described in J.A.C.S. 73, page 2991 (1951). 77 parts of an acetone solution containing 14.9 parts of the triazine and 11.1 parts glycerol-alpha-monochlorohydrin were agitated as 8.0 parts sodium hydroxide were added. The exothermic reaction was controlled at 20–25° C. for ¾ hour. The temperature was then raised and held at 50° C. one hour. The main product isolated in solution form dried at 70° C. to a clear, balsam-like material. This hardened to a clear, slightly brittle film after heating at 120° C. one hour. It was then only slightly swelled by contact with acetone. The presence of epoxide was revealed by infrared absorption technique and also by titration after digestion with pyridine hydrochloride.

*Example 10*

2,4-dichloro-6-phenoxy-s-triazine was prepared from cyanuric chloride, phenol and sodium hydroxide by reaction of equimolecular quantities in acetone water solution at 0–5° C. and isolated in dry crystalline form. 24 parts together with 22 parts glycerol-alpha-monochlorohydrin were dissolved in 50 parts methyl isobutyl ketone and reacted with 16 parts sodium hydroxide at 20–25° C. The reaction product in solution form was examined for its film forming characteristics. When dried at 70° C. the solution yielded a soft, plastic film free of color. Baking at 120° C. for one hour was sufficient to harden it to a slightly brittle state. Contact with the original solvent then had practically little effect. The solution of the unpolymerized product withstood dilution with an equal volume of toluene, but not with cyclohexane or t-butanol.

*Example 11*

212 parts 1,2,4-butanetriol, 24 parts water and 4 parts of acetic anhydride were agitated in a flask and dry hydrogen chloride passed into the solution over a period of 2¾ hours. The temperature was maintained at 80–110° C. Weight increase was 83 parts. The product was fractionated and 94 parts collected at 105–110° C./14–15 millimeters. Considered to be the isomeric monochlorohydrins of 1,2,4-butanetriol, 25 parts were reacted with 24 parts, 2,4-dichlor-6-phenoxy-s-triazine and 16 parts sodium hydroxide in 50 parts dioxolane solvent as in earlier examples. By titration of the unreacted base in the sodium chloride residue which was recovered by filtration, it was found that 90% of the original sodium hydroxide used had reacted. Assuming the completion of stage one of the reaction, stage two had gone to 80% of completion. A water white translucent, firm plastic resin was recovered from the clarified solution by evaporation of the solvent at 70–120° C. This product compared in hardening rate with those of earlier examples as follows when heated in the forms of castings.

| Example | Temperature (° C.) | Time (minutes) | Physical Condition |
|---|---|---|---|
| 9 | 155 | 5 | Soft gel. |
|  |  | 20 | Firm. |
|  |  | 55 | Hard. |
| 10 | 155 | 6 | Plastic. |
|  |  | 20 | Firm. |
|  |  | 55 | Hard. |
| 11 | 180 | 40 | Soft gel. |
|  |  | 60 | Firm. |

The reaction involved in the process of our invention is a two-step mechanism. For example, when cyanuric chloride is reacted with glycerol-alpha-monochlorohydrin in a suitable solvent under mild heating conditions and with the addition of a suitable HCl acceptor, a chlorohydroxypropyl cyanurate type derivative is first formed. The additional HCl acceptor added to the reaction mix dehydrohalogenates the chlorohydroxypropyl groups to glycidyl radicals, thus forming a polymerizable product containing both the oxirane and triazine groups. The following formulas set forth the reaction mechanism:

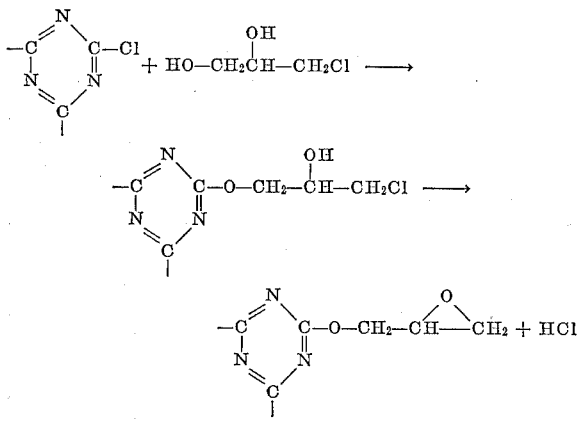

Among the polymerizable oxirane triazine compounds that may be prepared in accordance with our invention may be mentioned:

triglycidyl cyanurate;
2,4-diglycidyl-6-chloro-1,3,5-triazine;
2-glycidyl-4,6-dichloro-1,3,5-triazine;
2,4-diglycidyl-1,3,5-triazine;
2,4-diglycidyl-6-phenyl-1,3,5-triazine;
2,4-diglycidyl-6-methyl-1,3,5-triazine;
4,6-diglycidyl-2-alloxy-1,3,5-triazine;
2,4-dialloxy-6-glycidyl-1,3,5-triazine;
2,4-diglycidyl-6-methoxy-1,3,5-triazine;
2-amino-4,6-diglycidyl-1,3,5-triazine;
2-butylamino-4,6-diglycidyl-1,3,5-triazine;
2-diallylamino-4,6-diglycidyl-1,3,5-triazine;
2,4-diamino-6-glycidyl-1,3,5-triazine;
2-amino-4-glycidyl-6-methylamino-1,3,5-triazine;
2-glycidyl-4-di-(n-butyl)amino-6-ethylamino-1,3,5-triazine;
2-glycidyl-4-hexylamino-6-phenylethylamino-1,3,5-triazine;
2,4-bis(diallylamino)-6-glycidyl-1,3,5-triazine;
2-amino-4-glycidyl-6-propyl-1,3,5-triazine;
2-glycidyl-4-ethylamino-6-phenyl-1,3,5-triazine;
2-butyl-4-glycidyl-6-propylamino-1,3,5-triazine;
2-glycidyl-4,6-bis(diallylamino)-1,3,5-triazine;
2-glycidyl-4-methylamino-1,3,5-triazine;
2-amino-4-glycidyl-1,3,5-triazine;
2-amino-4-glycidyl-6-phenoxy-1,3,5-triazine;
2-glycidyl-4-methylamino-6-methoxy-1,3,5-triazine;
2-di(n-butyl)amino-4-glycidyl-6-methoxy-1,3,5-triazine;
2-glycidyl-4-diethylamino-6-phenoxy-1,3,5-triazine;
2-glycidyl-4-ethoxy-6-octylamino-1,3,5-triazine;
2-cyclohexylamino-4-ethoxy-6-glycidyl-1,3,5-triazine;
2,4-diethoxy-6-glycidyl-1,3,5-triazine;
2-glycidyl-4,6-diphenoxy-1,3,5-triazine;
2-glycidyl-4-phenoxy-1,3,5-triazine;
2,4-diglycidyl-6-phenoxy-1,3,5-triazine;
2-glycidyl-1,3,5-triazine;
2-glycidyl-4-decyl-6-tertiary butylphenoxy-1,3,5-triazine;
2-glycidyl-4-phenyl-6-p-tertiary butylphenoxy-1,3,5-triazine;
2-glycidyl-4,6-dipropyl-1,3,5-triazine;
2-glycidyl-4-methyl-1,3,5-triazine;
2-glycidyl-4-chloro-1,3,5-triazine;
2-glycidyl-4-bromo-6-phenyl-1,3,5-triazine;
2-glycidyl-4-chloro-6-methyl-1,3,5-triazine;
4-glycidyl-6-iodo-2-alloxy-1,3,5-triazine;
2-glycidyl-4-chloro-6-methoxy-1,3,5-triazine;
2-amino-4-chloro-6-glyicdyl-1,3,5-triazine;
2-butylamino-4-bromo-6-glycidyl-1,3,5-triazine;
2-diallylamino-4-chloro-6-glycidyl-1,3,5-triazine.

While the above discloses the polymerizable glycidyl triazine compounds, it will be understood that other compounds prepared by reacting trihydric alcohols containing four or more carbon atoms not in excess of ten may also be prepared in accordance with our invention.

In the process of our invention the molar proportion of the monohalohydrin of a saturated aliphatic trihydric alcohol to the compound represented by the general formula will be determined by the number of halogens present in the latter compound. For example, when cyanuric chloride is employed, three mols of the monohalohydrin of the trihydric alcohol will be used for each mol of cyanuric chloride. When compounds such as 2-chloro-4,6-dimethoxy-1,3,5-triazine are employed, 1 mol of the monohalohydrin of a trihydric alcohol will be utilized. Correspondingly, when a dihalo compound is utilized, 2 mols of a monohalohydrin of a saturated aliphatic trihydric alcohol will be used per mol of the compound. It will thus be seen that the molar proportion of monohalohydrin to halo triazine may vary from about 1:1 to about 3:1 depending upon the particular halo triazine reacted. A slight excess of monohalohydrin may even be used in our invention if so desired. A molar proportion of less than one mol of monohalohydrin per halogen present in the general formula may also be used. Thus, when cyanuric chloride is reacted with a monohalohydrin, one, two or three mols of the monohalohydrin may be employed. This variation in the molar proportion of monohalohydrin is also possible when a dihalo compound of the general formula is present. In that instance, one or two mols of monohalohydrin may be reacted with one mol of the dihalo compound.

The temperature of reaction should be within the range of from about 0° C. to about 75° C. with a range of from about 25° C. to about 35° C. preferred for optimum yield. At elevated temperatures the halogen acceptor tends to decompose the oxirane ring, while at low temperatures the removal of the halogens from the triazine compound is not complete and consequently the oxirane yield is low. For high yields of the oxirane triazines a slow addition of an acceptor for the freed halogen, e.g. 1 to 2 hours, with a minimum amount of cooling necessary to control the exotherm and an additional reaction time of from about 2 to 5 hours with a preferred time of about 4 hours gives the best results. The solvent employed in the process of our invention is limited to those which are non-reactive toward the triazine compound, the monohalohydrin of the trihydric alcohol, the oxirane group formed or the halogen acceptor and must dissolve the reactants and the oxirane containing product. A satisfactory solvent is dioxane. Other solvents that may find employment in the instant process are acetone, ethylene glycol dimethyl ether, diethylene glycol diethyl ether, dioxolane, dimethyl formamide, methyl isobutyl ketone, dichlorobenzene, etc. From an examination of the formula setting forth the reaction mechanism, it will be seen that during the dehydrohalogenation HCl, HI, HF or HBr will be formed depending upon the particular halogen present in the compound of the general formula and also upon the halogen present in the monohalohydrin. As used herein, a halogen acceptor is any compound that will accept or neutralize the halogen acid formed. The amount of halogen acceptor introduced into the reaction mixture will therefore be determined by the number of halogen atoms freed during the reaction. In order to insure a complete acceptance or neutralization of the liberated halogen an excess of halogen acceptor may be introduced into the reaction mass without being detrimental to the desired reaction. Any excess halogen acceptor present may be easily separated from the reaction product. Suitable halogen acceptors are such inorganic basic materials as sodium hydroxide, calcium oxide, barium oxide, sodium carbonate, potassium hydroxide, sodium bicarbonate, calcium hydroxide, potassium oxide, barium carbonate, barium hydroxide, sodium aluminate and the like.

The polymerizable reaction products of our invention find utilization in the preparation of laminates and other molded objects and the preparation of protective coating compositions to be applied to wood and metal surfaces in the form of enamels and clear finishes. In solution form they may be used, moreover, as impregnants or finishing agents for wool, rayon or cotton fabrics or fabrics woven from synthetic fibers including polyamide, polyurethane, polyacrylonitrile, polyglycol terephthalate types or they may be applied to the film during or after spinning for improving water resistance, dyeability and anti-static property. They may also be used as binding agents for pigments or other protective coatings or as components of printing inks and pastes to be applied to cellophane, paper, leather or other materials or in the form of adhesive compositions for wood and metals. The polymerizable reaction products may be used in conjunction with other resinous or polymerizable compositions including urea-formaldehyde resins, melamine-formaldehyde resins, phenolformaldehyde resins, polystyrene, polyamides, polyester amides, copolymers derived from unsaturated polyesters and vinyl monomers, copolymers of vinyl chloride and acrylonitrile, acrylonitrile and vinyl acetate or in conjunction with alkyd resins, other epoxy resins as well as silicone resins.

In the following examples the employment of the polymerizable reaction product of our invention in forming laminates and protective films is set forth. All parts given are parts by weight and the operating conditions set forth are not to be considered limitations unless otherwise noted.

*Example 12*

A paper laminate of the reaction product prepared in Example 1 was prepared by thrice impregnating paper sheets with the dioxane resin solution and heating at 70 to 90° C. for 15 minutes to remove the solvent after each treatment. Multiple 6 x 6 inch sheets so treated were superimposed and the assembly pressed between stainless steel platens of a molding press having a temperature of 180° C. under a pressure of 18 tons for 30 minutes. The resulting laminate one sixteenth inch thick was uniform in appearance, a light straw translucent color, hard and abrasion resistant with good gloss. It gained 0.25% in weight as a result of a 15 minute water boil test but was otherwise unaffected. At lower cure temperatures the color was lighter but water absorption tended to be higher. The resin content of this laminate was 65%. Other similar laminates were prepared in which the resin content varied from 40 to 60%. Cure temperatures of 125 to 180° C. were employed, the best results being noted at the highest temperature. Also, a pressure varying from about 500 to about 2000 p.s.i. may be used if desired. In view of the good resistance to high temperatures, the resins of this invention offer advantages when used in conjunction with heat resistant fillers such as woven glass and nylon fabrics.

One of the unusual characteristics of these new resins is the inherent property of curing by application of heat and without the necessity of using catalysts. In this respect, they are unlike the usual epoxide resins. This property is illustrated in Example 13.

*Example 13*

Films of the reaction product of Example 1 were cast from dioxane solution and baked for 30 minutes at temperatures from 100 to 250° C. The following table shows the results obtained:

| Baking Temperature | Color of Film | Results of 5-minute Boil |
| --- | --- | --- |
| 100° C | Water white | Softened and became sticky. |
| 150° C | ___do___ | Clouded and slightly softened. |
| 200° C | Very slightly yellow | Clear, hard, but lost adhesion to glass. |
| 250° C | Dark yellow | Almost no effect. |

All films were clear and very hard. Boiling dioxane had no effect on film cured at 190° C. The temperature employed to cure the resinous material may vary from about 100° C. to about 300° C. with the preferred temperature range being from about 120° C. to about 250° C. While the oxirane triazine resins may be cured by themselves, certain addition agents serving as catalysts or cross-linking agents or coreactants may be beneficially added. These serve to lower the curing temperatures from the levels required otherwise. Thus, for example, additives such as triethylamine, benzylamine, 1,5-pentanediol when added to the extent of 5-10% of the weight of the resin served to lower the necessary baking temperature for resin films from about 190° C. to 150° C. for boil resistance. These coatings were applied to glass and metal test panels by dip coating and were of the thicknesses commonly used in commercial finishing operations. When used in conjunction with other film forming agents such as phthalic glyceride alkyd resins having heat treated castor or soya oil or drying and non-drying fatty acid modifiers, or in conjunction with other epoxy resins such as those derived from 1,5-pentanediol and epichlorohydrin or p,p'-isopropylidene bis phenol and epichlorohydrin, excellent films were obtained. Approximately equal parts of oxirane triazine and modifier were used with beneficial improvement in film characteristics.

Other methods of preparing oxirane triazines will occur at once from the foregoing description to one skilled in the art. For example, by the known method of alcohol-ether exchange, it may be expected that a halohydrin will exchange with alkoxyl, such as methoxyl, groups attached to the triazine nucleus. See U.S. Patent 2,557,625 for example. Furthermore, dehydrohalogenation of glycerol-alpha-monochlorohydrin to glycidol followed by reaction with a cyanuric halide or halotriazine in the presence of an acid acceptor or analogous treatment with other suitable halohydrins offers an alternative means of making the products of the type described.

We claim:
1. Triglycidyl cyanurate.
2. A process which comprises reacting in the presence of a halogen acceptor and a solvent at a temperature within the range of from about 0° C. to about 75° C. (A) a monohalohydrin of a saturated aliphatic trihydric alcohol wherein said alcohol contains from 3 to 10 carbon atoms and wherein the halogen is selected from the group consisting of chlorine, bromine and iodine with a compound (B) represented by the general formula

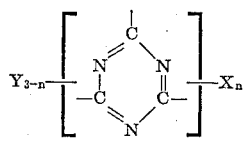

wherein X represents a halogen, Y represents a member selected from the group consisting of (a) a member selected from the class consisting of hydrogen and alkyl, alkenyl, aryl, alkaryl and aralkyl radicals, (b) amine radicals represented by the formula —NRR' where R and R' each represents a member having the same meaning as (a), and (c) radicals represented by the formula —OR" where R" represents a member selected from the class consisting of alkyl, alkenyl, aryl, alkaryl and aralkyl radicals, and $n$ represents an integer which is at least 1 and not more than 3.

3. A process of preparing a resinous composition which comprises polymerizing at elevated temperature the dehydrohalogenated reaction product of (A) a monohalohydrin of a saturated aliphatic trihydric alcohol wherein said alcohol contains from 3 to 10 carbon atoms and wherein the halogen is selected from the group consisting of chlorine, bromine and iodine with a compound (B) represented by the general formula

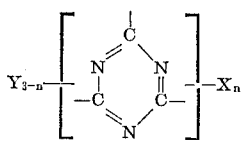

wherein X represents a halogen, Y represents a member selected from the group consisting of (a) a member selected from the class consisting of hydrogen and alkyl, alkenyl, aryl, alkaryl and aralkyl radicals, (b) amine radicals represented by the formula —NRR' where R and R' each represents a member having the same meaning as (a), and (c) radicals represented by the formula —OR" where R" represents a member selected from the class consisting of alkyl, alkenyl, aryl, alkaryl and aralkyl radicals, and $n$ represents an integer which is at least 1 and not more than 3.

4. The production of laminated articles which comprises impregnating a base material with the dehydrohalogenated reaction product of (A) a monohalohydrin of a saturated aliphatic trihydric alcohol wherein said alcohol contains from 3 to 10 carbon atoms and wherein the halogen is selected from the group consisting of chlorine, bromine and iodine with a compound (B) represented by the general formula

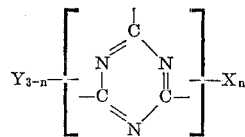

wherein X represents a halogen, Y represents a member selected from the group consisting of (a) a member selected from the class consisting of hydrogen and alkyl, alkenyl, aryl, alkaryl and aralkyl radicals, (b) amine radicals represented by the formula —NRR' where R and R' each represents a member having the same meaning as (a), and (c) radicals represented by the formula —OR" where R" represents a member selected from the class consisting of alkyl, alkenyl, aryl, alkaryl and aralkyl radicals, and $n$ represents an integer which is at least 1 and not more than 3, combining a plurality of said impregnated base materials and forming said laminated article under heat and pressure.

5. A method which comprises casting a film of the dehydrohalogenated reaction product of (A) a monohalohydrin of a saturated aliphatic trihydric alcohol wherein said alcohol contains from 3 to 10 carbon atoms and wherein the halogen is selected from the group consisting of chlorine, bromine and iodine with a compound (B) represented by the general formula

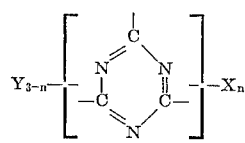

wherein X represents a halogen, Y represents a member selected from the group consisting of (a) a member selected from the class consisting of hydrogen and alkyl, alkenyl, aryl, alkaryl and aralkyl radicals, (b) amine radicals represented by the formula —NRR' where R and R' each represents a member having the same meaning as (a), and (c) radicals represented by the formula —OR" where R" represents a member selected from the class consisting of alkyl, alkenyl, aryl, alkaryl and aralkyl radicals, and $n$ represents an integer which is at least 1 and not more than 3 onto an inert base material and baking said film at elevated temperature.

6. A process which comprises reacting in the presence of a halogen acceptor and a solvent and at a temperature within the range of from about 0° C. to about 75° C. glycerol-alpha-monochlorohydrin and cyanuric chloride.

7. A process which comprises reacting in the presence of a halogen acceptor and a solvent and at a temperature within the range of from about 0° C. to about 75° C. glycerol-alpha-monochlorohydrin and 2-chloro-4,6-dimethoxy-1,3,5-triazine.

8. A process which comprises reacting in the presence of a halogen acceptor and a solvent and at a temperature within the range of from about 0° C. to about 75° C. glycerol-alpha-monochlorohydrin and 2,4-dichloro, 6-phenoxy-1,3,5-triazine.

9. The production of laminated articles which comprises impregnating a base material with the dehydrohalogenated reaction product of glycerol-alpha-monochlorohydrin and cyanuric chloride, combining a plurality of said impregnated base materials and forming said laminated article under heat and pressure.

10. The production of laminated articles which comprises impregnating a base material with the dehydrohalogenated reaction product of glycerol-alpha-monochlorohydrin and 2-chloro-4,6-di-methoxy-1,3,5-triazine, combining a plurality of said impregnated base materials and forming said laminated article under heat and pressure.

11. The production of laminated articles which comprises impregnating a base material with the dehydrohalogenated reaction product of glycerol-alpha-monochlorohydrin and 2,4-dichloro-6-phenoxy-1,3,5-triazine, combining a plurality of said impregnated base materials and forming said laminated article under heat and pressure.

12. A method which comprises casting a film of the dehydrohalogenated reaction product of glycerol-alpha-monochlorohydrin and cyanuric chloride onto an inert base material and baking said film at elevated temperature.

13. A method which comprises casting a film of the dehydrohalogenated reaction product of glycerol-alpha-monochlorohydrin and 2-chloro-4,6-dimethoxy-1,3,5-triazine onto an inert base material and baking said film at elevated temperature.

14. A method which comprises casting a film of the dehydrohalogenated reaction product of glycerol-alpha-monochlorohydrin and 2,4-dichloro-6-phenoxy-1,3,5-triazine onto an inert base material and baking said film at elevated temperature.

15. A polymerizable oxirane triazine having the following formula

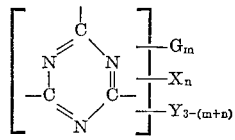

wherein X represents a halogen; Y represents a member selected from the group consisting of (a) a member selected from the class consisting of hydrogen and alkyl, alkenyl, aryl, alkaryl and aralkyl radicals, (b) amine radicals represented by the formula —NRR′ where R and R′ each represents a member having the same meaning as (a), and (c) radicals represented by the formula —OR″ where R″ represents a member selected from the class consisting of alkyl, alkenyl, aryl, alkaryl and aralkyl radicals; G represents a member selected from the radicals represented by the formula

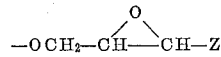

and

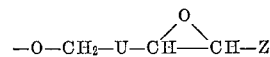

where U is an alkylene radical and Z represents a member selected from the class consisting of hydrogen and saturated aliphatic radicals, the total number of carbon atoms being no more than 10; $m$ represents an integer of from 1 to 3 and $n$ represents an integer of from 0 to 2 where the sum of $n$ and $m$ does not exceed 3.

16. Cyanuric acid tris(epoxyalkyl) triester wherein the epoxy is an oxirane group.

References Cited in the file of this patent

UNITED STATES PATENTS

| | | |
|---|---|---|
| 2,070,990 | Groll et al. | Feb. 16, 1937 |
| 2,080,051 | Landucci | May 11, 1937 |
| 2,144,548 | Safford | Jan. 17, 1939 |
| 2,224,849 | Groll et al. | Dec. 17, 1940 |
| 2,304,624 | Burke | Dec. 8, 1942 |
| 2,355,770 | Wyler | Aug. 15, 1944 |
| 2,439,648 | Burtle et al. | Apr. 13, 1948 |
| 2,557,667 | Kropa | June 19, 1951 |
| 2,582,613 | Wohnsiedler et al. | Jan. 15, 1952 |
| 2,643,964 | Smith-Johannsen | June 30, 1953 |
| 2,652,372 | Farlow et al. | Sept. 15, 1953 |
| 2,656,297 | Davis et al. | Oct. 20, 1953 |
| 2,741,607 | Bradley et al. | Apr. 10, 1956 |

OTHER REFERENCES

"Epichlorohydrin," Technical Booklet SC: 49–35, 1949, Shell Chemical Corporation (page 9 relied on in the brief).